March 11, 1930. C. H. KNUDSEN 1,750,044
SHAFT MOUNTING AND COUPLING FOR ENGINES AND COOPERATIVE PARTS
Original Filed March 12, 1926
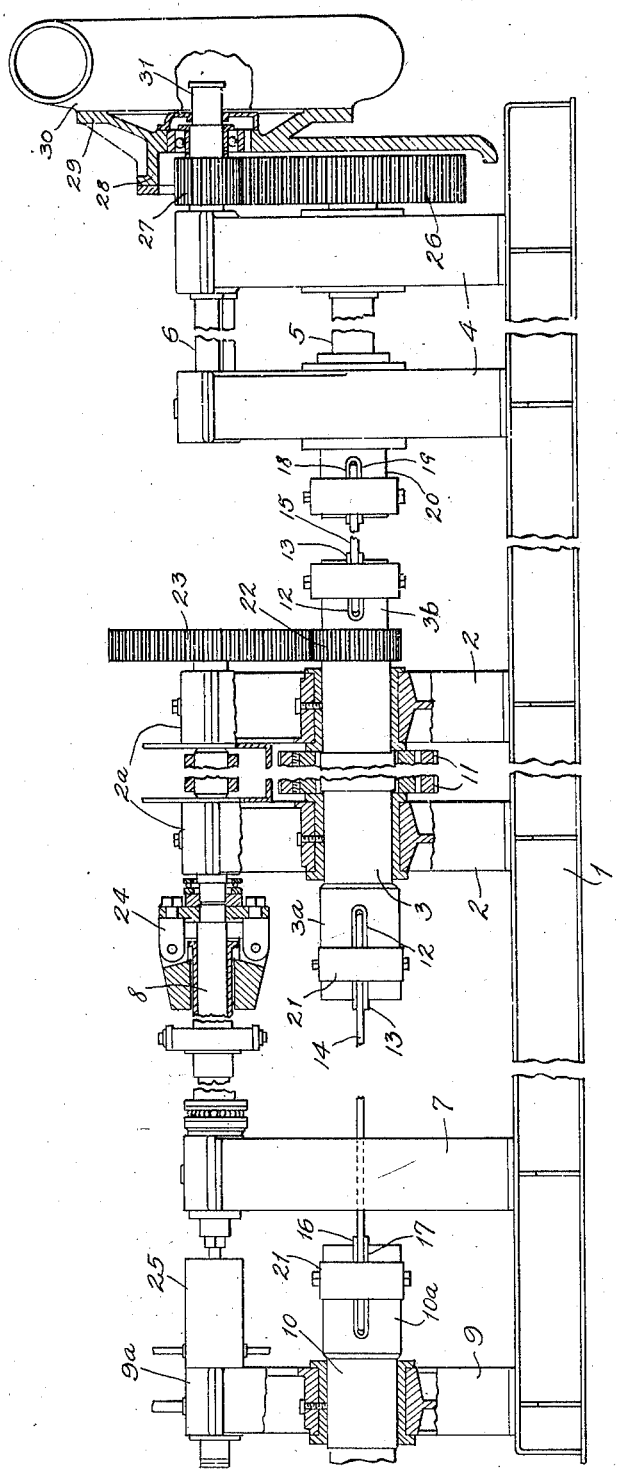
INVENTOR
Carl H. Knudsen
BY
Howard C. Thompson
ATTORNEY Patented Mar. 11, 1930

1,750,044

UNITED STATES PATENT OFFICE

CARL H. KNUDSEN, OF NEW YORK, N. Y.

SHAFT MOUNTING AND COUPLING FOR ENGINES AND COOPERATIVE PARTS

Application filed March 12, 1926, Serial No. 94,344. Renewed May 25, 1929.

This invention relates to the shaft mountings and couplings of internal combustion engines, and apparatus driven by said engine, and particularly to the operation of blowers, generators, governors and like apparatus; and the object of the invention is to provide a shaft mounting and coupling of the class specified which is so constructed and arranged as to provide the most direct drive to the apparatus to be driven by the engine through resilient or flexible couplings whereby the stress or strain is compensated for, and further whereby the several apparatus may be assembled in a limited space and further in effecting a saving in material and labor; and with these and other objects in view, the invention consists in an apparatus of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters and in which:

The drawing is a diagrammatic view illustrating the shaft mountings and couplings of several mechanisms in full and in section, with parts of the construction broken away.

In the drawing, 1 represents a frame on which is mounted and supported the bearings 2 for the driven shaft 3 of an internal combustion engine, bearings 4 for shafts 5 and 6 and a bearing 7 for a governor shaft mechanism, the governor shaft proper 8 being supported in extensions 2ª on the bearings 2; at 9, one of the bearings of a generator shaft 10. The extension 9ª of the last named bearing also supports part of the governor mechanism.

The shaft 3 driven from the engine through a gear or gears 11, positioned between the bearings 2, is provided at its opposite ends with enlargements 3ª and 3ᵇ, both of which are split as seen at 12 to receive U-shaped members 13 in the channel of which resilient coupling bars 14 and 15 are adapted to be mounted, the end of the bar 14 fitting in the member 13 of the enlarged end 3ª of the shaft 3, while one end of the bar 15 fits in the enlarged end 3ᵇ of said shaft. The other end of the bar 14 fits in a corresponding member 16 in a split 17 in the enlarged end 10ª of the shaft 10, while the other end of the bar 15 sets in a U-shaped member 18 in a split 19 in the enlarged end 20 of the shaft 5. The bars 14 and 15 are retained against displacement from the respective shafts by collars 21, encircling the slit portions of said shafts as clearly seen. The specific shaft coupling herein shown is made the subject matter of a companion application filed March 12, 1926, and bearing Serial Number 94,343, and is shown and described herein for the purpose of illustrating the desired type of coupling to be employed.

On the shaft 3 at one side of one of the bearings 2 therefor is a gear 22 which meshes with another gear 23 on the governor shaft 8, the governor being shown at 24. At the left of the drawing and adjacent the bearings 7 and 9ª is shown mechanism 25 for controlling and regulating the governor action which forms the subject matter of a copending application, and has no particular bearing on my present invention aside from the mounting therefor herein shown and described.

On the shaft 5 which is driven from the shaft 3 through the coupling 15 is a gear 26 which meshes with a pinion 27 on the shaft 6 at the upper ends of the bearing 4, the shaft 6 projecting forwardly through a casing 28 at the outer side of the gears 26 and 27, said casing 28 having a flange extension or bracket construction 29 for supporting a centrifugal blower or similar apparatus 30 driven by the extension 31 on the shaft which extends into said blower. With this construction, it will be apparent that the blower is driven more or less directly from the power driven shaft 3 of the engine through the coupling 15 and shafts 5 and 6, having the gears 26 and 27.

The shaft 10 extends to the left and constitutes the shaft of an electric generator which is driven directly from the driven shaft 3 through the coupling 14. It will be understood that the particular apparatus of which the shaft mountings and couplings herein shown and described constitute an illustration, is designed primarily for use in locomotives employing an internal combustion engine, preferably of the fuel oil type, which actuates an electric generator for generating electricity in the production of an electric locomotive with its own power plant. Due to the limited amount of frame space and the desirability of arranging the several mechanisms as compactly as possible, I have devised the shaft mounting and coupling herein set out whereby the centrifugal blower 30 may be directly applied to the engine structure or the casing 28 thereof and driven through comparatively short shaftings and in as direct a manner as possible with the provision of the required bearings therefor, as well as in the direct coupling of the generator shaft with the power driven shaft of the engine, and through simple flexible couplings in the form of bars of spring material having sufficient resiliency to compensate for the throws and strains that may prevail in the transmission of power from the shaft 3 to the shafts 5 and 10 as well as the shafts 6 and 8.

It will be understood that while I have shown specific apparatus operatively coupled with the power driven shaft, that my invention is not necessarily limited to the showing in the drawing and the description thereof in the specification, and various other changes in and modifications of the construction herein set out may be made within the scope of the appended claims without departing from the spirit of my invention or sacrificing its advantages.

Having fully described my invention, what I claim as new and desire to secure by Letters Patent, is:

1. An apparatus of the class described comprising an engine driven shaft, a supplemental driven shaft arranged at one end of and in axial alinement with the first named shaft and coupled therewith by a flexible coupling, a blower shaft arranged in parallel relation and geared to said supplemental shaft, a blower mechanism actuated by said blower shaft, and a governor shaft arranged in parallel relation to and geared directly in connection with the first named engine driven shaft.

2. An apparatus of the class described comprising an engine driven shaft, a supplemental driven shaft arranged at one end of and in axial alinement with the first named shaft and coupled therewith by a flexible coupling, a blower shaft arranged in parallel relation and geared to said supplemental shaft, a blower mechanism actuated by said blower shaft, a governor shaft arranged in parallel relation to and geared directly in connection with the first named engine driven shaft, and a generator shaft arranged at the opposite end of the first named shaft and in axial alinement therewith and said last named shafts being secured together by a flexible coupling.

3. An apparatus of the class described comprising an engine driven shaft, a supplemental driven shaft arranged at one end of and in axial alinement with the first named shaft and coupled therewith by a flexible coupling, a blower shaft arranged in parallel relation and geared to said supplemental shaft, a blower mechanism actuated by said blower shaft, a governor shaft arranged in parallel relation to and geared directly in connection with the first named engine driven shaft, a generator shaft arranged at the opposite end of the first named shaft and in axial alinement therewith and said last named shafts being secured together by a flexible coupling, and said flexible couplings consisting of flat bars of spring metal traversing the axis of the respective shafts.

4. An apparatus of the class described comprising a frame, a plurality of shaft bearings in said frame, an engine driven shaft supported in two of said bearings, a governor shaft mounted in other bearings of the frame and arranged in parallel relation to said driven shaft and geared directly in connection therewith, a supplemental driven shaft arranged at one end of the first named shaft and in other bearings of the frame and in axial alinement with and flexibly coupled with said driven shaft, another shaft arranged in parallel relation to the supplemental shaft in bearings of the frame and geared to said supplemental shaft, and a blower apparatus actuated by said last named shaft.

5. An apparatus of the class described comprising a frame, a plurality of shaft bearings in said frame, an engine driven shaft supported in two of said bearings, a governor shaft mounted in other bearings of the frame and arranged in parallel relation to said driven shaft and geared directly in connection therewith, a supplemental driven shaft arranged at one end of the first named shaft and in other bearings of the frame and in axial alinement with and flexibly coupled with said driven shaft, another shaft arranged in parallel relation to the supplemental shaft in bearings of the frame and geared to said supplemental shaft, a blower apparatus actuated by said last named shaft, and a generator shaft mounted in other of said bearings and in axial alinement with and flexible with the first named driven shaft.

In testimony that I claim the foregoing as my invention I have signed my name this 23rd day of Feb. 1926.

CARL H. KNUDSEN.